US007305290B2

(12) United States Patent
Russ et al.

(10) Patent No.: US 7,305,290 B2
(45) Date of Patent: Dec. 4, 2007

(54) CONTROLLING DEVICE OF A REGULATING DEVICE OF A MOTOR VEHICLE

(75) Inventors: Detlef Russ, Ebersdorf bei Coburg (DE); Juergen Buhlheller, Knetzgau (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 49 days.

(21) Appl. No.: 11/032,309

(22) Filed: Jan. 10, 2005

(65) Prior Publication Data

US 2005/0203690 A1 Sep. 15, 2005

(30) Foreign Application Priority Data

Jan. 10, 2004 (DE) .................. 20 2004 000 266 U

(51) Int. Cl.
*H02H 3/00* (2006.01)
*H02H 7/085* (2006.01)

(52) U.S. Cl. .......................................... 701/36; 701/49

(58) Field of Classification Search ..................... None
See application file for complete search history.

(56) References Cited

U.S. PATENT DOCUMENTS 4,347,465 A * 8/1982 Goertler et al. ............. 318/266
5,488,276 A * 1/1996 Nishibe ...................... 318/473
5,977,732 A * 11/1999 Matsumoto ................. 318/283
6,247,947 B1 * 6/2001 Knoernschild et al. ..... 439/159
6,329,779 B1 * 12/2001 Pimley et al. ............. 318/445
6,840,113 B2 * 1/2005 Fukumura et al. ............ 73/760
6,870,339 B2 * 3/2005 Kessler et al. .............. 318/468
6,894,451 B2 * 5/2005 Shinohara ................... 318/566
6,918,209 B2 * 7/2005 Regnier et al. ............... 49/352
2002/0190680 A1 * 12/2002 Gerbetz ...................... 318/445
2003/0225497 A1 * 12/2003 Whinnery .................... 701/49

FOREIGN PATENT DOCUMENTS

JP 09-21273 * 1/1997

* cited by examiner

*Primary Examiner*—Micahel J. Zanelli
(74) *Attorney, Agent, or Firm*—Jacob Eisenberg

(57) ABSTRACT

The present invention relates to a controlling device of a regulating device of a power window. The controlling device includes at least one computer unit to control an actuator of the regulating device. The computer unit is set up to stop or initiate the stop of an adjusting motion of the actuator if a signal correlating to the rotary moment of the actuator exceeds a current response level. The signal correlating to the rotary moment of the actuator may be the driving power and/or its temporal change, the rotary frequency of the actuator and/or its temporal change and/or a power effecting the actuator and/or its change. The current response level is thereby not a fixed threshold value, but a changing value, which is changeable by the computer unit.

12 Claims, 4 Drawing Sheets

CONTROLLING DEVICE OF A REGULATING DEVICE OF A MOTOR VEHICLE

BACKGROUND OF THE INVENTION

The present invention concerns a window lifter, a controlling device of a window lifter and a method to control the window lifter. The present application may be applied to other moving parts of a motor vehicle including a hatchback, sun roof and the like.

A method for the control and regulation of the adjusting movement of a translational adjustable component, especially of a window lifter of a power window in motor vehicles, is known in the art from the DE 197 45 597 A1. The method considers the driving device as well as the control and regulating electronics. Accordingly, an effective squeeze protection is obtained which considers sufficient regulating power in difficult areas and the body of the vehicle along with external conditions, forces and influences. The driving device exercises such regulating power, the power being equal to the sum of superfluous power and necessary power to adjust the component, whereby the sum is less or equal to the acceptable squeezing power. The regulating or superfluous power is additionally regulated with respect to the forces effecting the body of the vehicle or parts thereof.

The aforementioned solution substantially guarantees a squeeze protection affecting the entire regulation area, thereby being in compliance with very high protection requirements or regulations. In addition, it is guaranteed that the regulating power is sufficient in restricted areas; and that a regulating device adjusts a translational adjustable component, gently with respect to the material, so as to consider the external influences affecting the body of the vehicle according to the mass-giving operator. The forces affecting the body of the vehicle or the acceleration forces are herein understood as being external influences which are not immediately caused by the regulating device or by a driving device, but which occur for example because of the bad conditions of the driving route (e.g. driving over a pothole) or during the closing of a vehicle door.

It is additionally provided, that a regulation of the regulating power or the superfluous power is interrupted during the occurrence of acceleration forces affecting the body of the vehicle and within a changing preset time frame and a threshold value is preset in such a way, that the regulating power is always less or even to the acceptable squeezing force. The time frame may be for example 100 ms. This form of execution considers that the threshold value is not always changed within a short time frame at always changing acceleration forces affecting the body of the vehicle, which in turn could lead to an impairment of the movement of the translational adjustable component. A secure movement of the translational adjustable component is guaranteed also as squeeze protection by the preset threshold value, which is always less or even to the acceptable squeezing force.

The acceleration forces affecting the body of the vehicle are preferably detected by a sensor, such as for example a digital signal sensor. Digital signals can be easily further processed in the control and regulation electronics. The adjustment of one or more regulations, in successively connecting signals of the sensor, can be evaluated by the control and regulation electronics. The repeated valuation of the signals of the sensor enables one to securely identify a simultaneous occurrence of the acceleration forces caused by external influences and the forces conditional in the event of squeezing.

A motor driving device for a motor vehicle is known in the art from DE 195 17 958. The rotation of the motor is immediately stopped, at the motor driving device, for an electrical window lifter, when an obstacle is placed against the movement of the window. The motor driving device serves to open and close the moveable part (window) and can be selectively turned on and off.

An electrical current meter device measures the current conducting by the motor at a start compensation time; an intensity changing detector detects an intensity increment from the measured current at each constant time frame; and a motor controlling device delivers a first or a second control signal to the motor driving device whereby the motor operation is continued with the first signal depending on the polarity of the intensity increment and the motor immediately stopped with the second signal.

Two monitoring switches mark the rotating direction of the motors, a pair of touch-buttons for the correspondent motor directions and two self-holding switches for the two rotational directions of the motors enable a rotation of the motor at operation of one of the touch-buttons.

A control device for power locks is known in the art from DE 196 49 698. The control device is independent from its configuration and can be operated in different ways directly and by a distance switch. Security measures use an adjustment strategy to enable a highly sensitive detection of an impediment by, for example, learning the power requirements of the system and equipping it within a safety margin. The control system allows a complete manual operation of the lockage.

Information about the operational power which is necessary at each point of the motion path of the rear flap along its predetermined motion path to close the rear flap is stored. Values are stored in four multi-dimensional arrangements. The dimensions of the arrangement are motion direction and position. The motion direction is open and close. The position is any number of divisions of the specified path. The following are determined: the operating force (fmem); the time derivation of the operating force (dfmem); the fluctuations of the operating force measurements (vfmem); and the fluctuation of the measurements of the derivation of the operating force after the time (vdfmem). Further stored values include the number of the rear flap opening and closing actions without the detection of an obstacle, the number of the detected obstacles, and the average operating force over the last n minutes.

The operation of the rear flap occurs at time t, at which time the rear flap is located in the area p along its predetermined path, and the motion direction of the rear flap is d. The storage values are used for the detection of an obstacle as follows:

The measured force of the first operating device is compared with the power arrangement for the present rear flap position and direction with a system-dependant combination of the following conditions.

The present force (f(d,t)) is greater than the force stored in the storage for this rear flap position (fmem(d,p)), i.e. by a deviation (fmargin(d)).

The present derivation of the force according to the time (df/dt(d,t)) is greater than the time deviation of the force, which is stored in the storage for this rear flap position (dfmem(d,p)), i.e. by a deviation (dfmargin (d)).

The present force (f(d,t)) is greater than a predetermined absolute maximal force (fmax(d)). This maximal force is a maximum, which must not be exceeded under any circumstances.

The deviation is thereby adjustable. In addition, the tolerance (fmargin as well as dfmargin) can be designed as a function of vfmem(d,p) and vdfmem(d,p). This means, that the tolerance itself is a function of the position and varies at each position with time when the force varies. As such, the tolerance is also increased with an increase of the temporary or local change of the force.

If the force at position d,p is the same at each cycle, the tolerance becomes lower and the system more sensitive. If the force at the position d,p is significantly different during each run, the tolerance may tend to remain high. The tolerance is limited so that it can not grow beyond a certain point with an indication of tolerance increase beyond its limit being a basis for indication of a system error.

In addition, to change the stored forces (either one or both of fmem(p) and dfmem(p)) as function of any external sensor (for example a temperature sensor) may be considered or known to anticipate environmental influences.

If the arrangements contain valid data, and the control device does not detect an obstacle during the rear flap motion, the values are adjusted according to the following formulas:

$$F\text{mem}(d,p)=(k_1\times f(d,p)+k_2\times f\text{mem}(d,p)/k_1+k_2$$

$$Df\text{mem}(d,p)=(k_3\times df/dt(d,p)+k_4\times df\text{mem}(d,p)/k_5+k_6$$

$$Vf\text{mem}(d,p)=(k_5\times(f(d,p)-f\text{mem}(d,p)+k_6\times vf\text{mem}(d,p)/k_5+k_6$$

$$Vdf\text{mem}(d,p)=(k_7\times(f(d,p)-f\text{mem}(d,p)+k_8\times vf\text{mem}(d,p)/k_7+k_8$$

Whereby $k_1$, $k_2$, $k_3$, $k_4$, $k_5$, $k_6$, $k_7$ and $k_8$ are determined empirically in dependence from the dynamics of the system. Accordingly, an increasing temporal change to the previous dfmem(d,p) leads to an increase of the new and current dfmem(d,p). $k_1$, $k_2$, $k_3$, $k_4$, $k_5$, $k_6$, $k_7$ and $k_8$ influence the speed with which the system learns and therefore, how the system responds to a changing environment. These values are typically selected in such a way that $k_1$, $k_3$, $k_5$ and $k_7$ are much smaller than $k_2$, $k_4$, $k_6$ and $k_8$.

SUMMARY OF THE INVENTION

It is a task of the present invention to further develop a control device of an adjustment device of a motor vehicle.

Accordingly, a control device of a regulating device of a motor vehicle is provided. The regulating device is preferably a window-lifter of a motor vehicle, however other motor vehicle movable parts may be regulated by the regulating device. Such other parts include a hatchback, power sun/moon roof and other movable parts envisioned by one skilled in the art as benefiting from the present regulating device. The control device can thereby be developed on a semiconductor chip, as a so-called smart-power solution as well as integrated intelligent power electronics, or comprise several electronic and/or electro-optical components. The control device may further comprise software, other hardware, and/or an appropriately programmed computer processor. As such, the controlling device comprises at least one computer unit to control an actuator of the regulating device, the computer comprising controlling code burned into a form of hardware or accessible via appropriate software. The computer unit is set up to stop an adjusting motion of the actuator or initiate a method to stop the adjusting motion of the starting actuator, if a signal correlating to the rotary moment of the actuator exceeds a current response level. This function can be described also as a squeeze protection function of a regulating device. The signal correlating to the rotary moment of the actuator may be for example the driving power and/or its temporal change, the rotary frequency of the actuator and/or its temporal change and/or a force effecting the actuator and/or its change. Apart from the above examples, other signals correlating with the rotary moment can be considered alternatively or in combination. Any form of dependence from the rotary number is understood under correlation. The kind of correlation is thereby dependant from the size to be evaluated. If, for example, the rotary number is evaluated, then the correlation is a characteristic curve of the rotary number-rotary moment of the actuator—this being especially true of an electro-motor. The response level is thereby substantially precise and current if it is compared with the signal measured for the same adjusting position for the squeeze protection. Furthermore, an adapted response level is determined for a successive adjustment by evaluating the current response level together with the current signal and possibly further influencing factors.

This is why the response level is not a fixed threshold value but a changing value which is changeable via the computer unit. With this current response level, the signal correlating to the rotary moment is compared and in the case of exceeding of the current response level, the actuator is controlled in dependence from the comparative result. This current response level is preferably regulated during the adjustment, by changing the current response level in dependence from the temporal and/or local change of the signal in such a way, that with increasing temporal or local change of the signal, the current response level is decreased. For a decrease of the current response level, it is led closer to the signal to be compared with, so that the distance between signal and current response level is reduced. If, for example, the driving power or a force is being evaluated as the signal, then the value of the current response level is increased so as to reduce the driving power or force. If, on the other hand, the reciprocal value of the rotary frequency is being evaluated as the signal, then the value of the current response level is reduced so as to reduce the reciprocal value.

The current amount of the value of the current response level is thereby preferably changed. The first as well as each further derivation of the signal according to location and/or to time is understood under the local or temporal change of signal. The temporal and/or local change of the signal also includes differences of the successive values of the signals, if the change is time-discontinuous and in particular local-discontinuous based on the measurement resolution.

The installation of the computer unit may for example occur by a program which running in the computer unit and with which the computer unit is respectively configured. This program can alternatively or in combination be burned and/or hardwired into the computer unit memory (ROM). This program thereby carries out a process, which enable the evaluation of the correlating signal. This program can be stored in a digital storage medium, for example a disk or a read only memory (EEPROM).

A particularly advantageous further development of the invention provides that the computer unit is set up to change the current response level only under the condition that the temporal or local change of the signal exceeds a minimum changing value. There is therefore no change to the current response level in dependence of the temporal or local change of the signal below this minimum changing value. A change of the response level, which is conditioned by other independences, is hereby not excluded however.

The response level can for example be adapted from other values. For the adaptation, it is provided, in an advantageous design of the invention, that values of the signal are evaluated and stored from at least a previous adjustment for the adaptation of the response level. The respective current value of the signal is preferably weighed with one factor and averaged with values of previous adjustments, which are all assigned to the same adjusting position. Another kind of averaging can occur by taking the basis of averaging previous values of the signal of the same adjustment and the determination of the current response level, especially by using an offset.

In another embodiment of the invention, the computer unit is set up to change the response level in addition to the dependence from the course of the average amount of the signal. The response level is hereby changed in dependence from this amount. As indicated above, this may occur by an averaging of the signal with the same or different weighing factors for the respective values of the signal. The adapted response level is hereby adjusted with settings to slow changes of amounts of the signal and is set up advantageously in an essentially constant distance to the average of the signal for these slow changes of amount. Slow changes of amount can, for example, be caused by changing temperatures of the mechanical restriction compared to the previous adjustments, so that an adjustment of the adapted response level is advantageous for a respective adjusting position allocated to restriction.

The averaging can for example occur over the last 4 to 8 values of the same adjustment or over 2 to 6 values of previous adjustments, which refer to the respective and same adjustment positions. Following this, short-term, non-significant changes do not cause any significant changes of the average. If the correlating signal is the rotary frequency of the actuator, it is therefore provided, that the computer unit is set up to change the response level in addition to the dependence from an absolute rotary number of regulating device.

According to another embodiment of the invention, the computer unit is set up to change the current or the adapted response level additionally in dependence from the stiffness of the regulating device. The stiffness of the regulating device could have thereby been detected preferably by the computer unit or it is loaded into the computer unit as a parameter set before initial operation. The stiffness can thereby be composed of different single rigidities of the regulating device.

A still further embodiment provides that the computer unit is set up to mathematically correlate the change of the current response level to the temporal or local change of the signal. The change of the signal does not only serve as a trigger for the change of the current response level but the value of the change of the current response level refers also to the value of the change of the signal.

Alternatively, the correlation is the change of the current response level in dependence from the performance data. The performance data is preferably stored in the computer unit and is especially adaptable by the computer unit. The changing values of the current response level of the temporal or local change of the signal is assigned to the performance data. In addition, the performance data may consider further dependences from further measure values or control signals and provide several sets of performance data for it.

Alternatively, the correlation is the change of the current response level in dependence of a mathematical function. The mathematical function hereby outputs the necessary changing value of the current response level as output quantity. The temporal or local change of the signal serves as an input quantity of the function. Further input quantities can be additionally evaluated with this function. Possible parameters of the function are changeable, especially by the computer unit or by other electronics.

The mathematical function is preferably a continuous function. An especially easy design of the variant provides that the changing value of the current response level is proportional to the temporal or local change of the signal for the decrease of the current response level. This variant can be combined especially advantageously with the minimum changing value. Alternatively, the mathematical function can also be a step function, which enable a simplified calculation of the current response level.

Apart from the control device, the invention also concerns a window lifter with an actuator and adjustment mechanics to regulate the position of the window pane. This window lifter additionally shows the above mentioned control device to control the actuator. As indicated above, application of the present invention is not limited to power windows.

Furthermore, the invention concerns a digital storage medium, especially a disc with electronically readable control signals, which can cooperate with a programmable computer unit in such a way that a method is carried out in which an adjusting motion of the actuator of the regulating device is stopped or a method to start stopping the adjusting motion of the actuator, when a signal correlating to the rotary motion of the actuator exceeds a current response level. In a further component of the method, the current response level is changed in dependence from the temporal or local change of the signal, by reducing the current response level with increasing positive temporal or local change of the signal.

In addition, the invention concerns a computer program product with program code stored on a machine-readable carrier for the execution of a method by stopping an adjusting motion of an actuator of the regulating device or a method to start stopping the adjusting motion of the actuator, when a signal correlating to the rotary moment of the actuator exceeds a current response level and by changing the current response level in dependence from the temporal or local change of the signal, if the program product runs on a computer unit.

In addition, the invention concerns a computer program with a program code for the execution of a method by stopping an adjusting motion of an actuator of the regulating device or a method to start the stopping of the adjusting motion of the actuator, when a signal correlating to the rotary moment of the actuator exceeds a current response level and by changing the current response level in dependence from the temporal or local change of the signal, if the program product runs on a computer unit.

BRIEF DESCRIPTION OF THE SEVERAL VIEWS OF THE DRAWINGS

In the following the invention is explained in more detail and by way of examples of embodiments referring to the appended drawings, wherein.

DETAILED DESCRIPTION OF THE INVENTION

Injuries and/or damage may occur in motor vehicles when an object and/or body part is squeezed or pinched by a closing part. Such closing parts may include power windows, power sunroofs, hatchbacks, trunks and the like. Such parts are commonly closed by actuation of an electric motor. Accordingly, to prevent such injury, it is necessary to effect a reverse of the electric motor as quickly and effectively as possible. The present invention is directed to such prevention and will be described with application to power windows with the understanding that other applications are possible.

Between the upper edge of the window pane and a seal of a window pane of a power-driven vehicle door, there is a danger during the closing process of the pane that the body part of a person is squeezed and injured in a split between the upper edge of the pane and the seal. To protect people from severe injuries, the electro motor of a window lifter moving the window pane is controlled by a controlling device which detects hereby the squeezing case.

Figure 1:
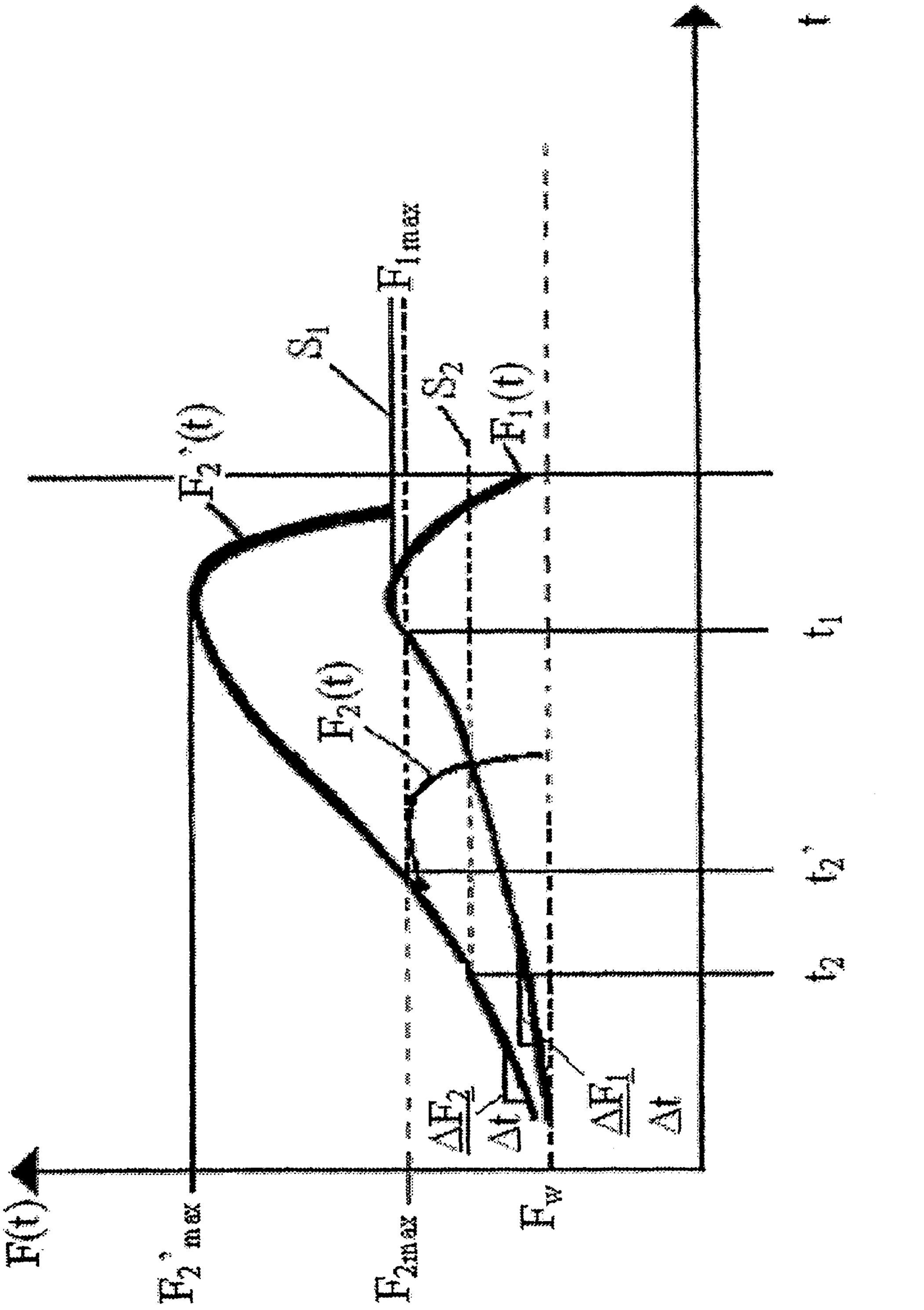
FIG. 1 depicts a schematic display of the course of a signal correlating to an actuating moment of a window lifter motor.

The controlling device is set up by a program to stop the closing motion of the electro motor or to initiate a stopping of the closing motion of the electro motor, when the case of squeezing is detected. The squeeze event is detected by the controlling device when a signal F, F(x), F(t) correlating to the rotary moment of the electro motor exceeds a current response level s, s(x), s1, s2. FIG. 1 depicts two cases of squeezing involving the aforementioned signal detection and their exceeding of a given threshold.

As depicted in FIG. 1, by way of example, the signals correlating to the rotary moment are time-relating measured forces $F_1(t)$, $F_2(t)$ and $F'_2(t)$. Alternative to these forces, signals correlating to the rotary moment of the electro motor, for example the actuating power of the electro motor or the rotary frequency of the electro motor, can be evaluated. Also alternatively to the time dependence of the course of this signal, a regulation-depending signal (n(x), see FIG. 2 or FIG. 4) correlating to the rotary moment of the electro motor can be evaluated.

Several temporal courses of the force F(t) are disclosed in FIG. 1. It is shown that the first course of the force $F_1(t)$ exceeds the current response level $s_1$ at time $t_1$. A squeezing event is thus occurring and is detected at this time by the controlling device and the electro motor is stopped and thereafter reversed. This motion is effected by powering the motor in an opposite direction as heretofore, thereby effecting the reversing motion or direction. The kinetic energy existing at the time of detection $t_1$ and in the window lifter will increase the force above the current response level $s_1$ based on the inertia of the window lifter system. As a result, a maximal squeeze power $F_{1max}$ is reached. The maximum squeeze power is the highest or total force applied in the closing direction to the window upon detection of a squeezing action.

The value of the maximal squeeze power $F_{1max}$ depends, apart from the existing kinetic energy at the time of squeezing $t_1$, upon a sum of the stiffness of the window lifter system and the stiffness of the squeezed body part. The squeezing of the body part causes a significant change $\Delta F_1/\Delta t$ of the force signal $F_1(t)$, originating from the force $F_v$ which was detected before the event of squeezing. This force $F_v$ is typically a previous temporal averaged value.

Of course different body parts have different rigidities thereby producing different feedbacks. For example, the second force signal $F_2(t)$ depicts a situation where a stiffer body part as per $F_1(t)$ is being squeezed. If the response level $s_1$ is constant and independent from the change $\Delta F_2/\Delta t$ of the force $F_2(t)$, it will lead, as disclosed in FIG. 1, to the case of a first significant change, $\Delta F1/\Delta t$ of the force $F_1(t)$ as compared to an increased second change $\Delta F_2/\Delta t$, at an increased maximal squeezing power $F'_{2max}$ (also at approximately $t_1$) As such, this increased maximal squeezing power $F'_{2\ max}$ at reaching the constant response level $s_1$ at time $t_2$, with the kinetic energy meeting the essentially stiffer body piece, has to be reduced over less adjusting time and in particular over a shorter adjustment path than with $F_1(t)$.

For illustration purposes, a squeezing force of $F_2'_{max}$ would be typically undesirable for safety reasons. To avoid such squeeze peaks $F_2'_{max}$, the current response level $S_2$ is reduced in dependence from the increased change $\Delta F_2/\Delta t$ of the force $F_2(t)$ to a lower level. This causes the detection by the controlling device of the event of squeezing to an already earlier time $t_2$. The occurring force peak $F_{2max}$, which effects the squeezed body piece is therefore essentially reduced.

Figure 2:
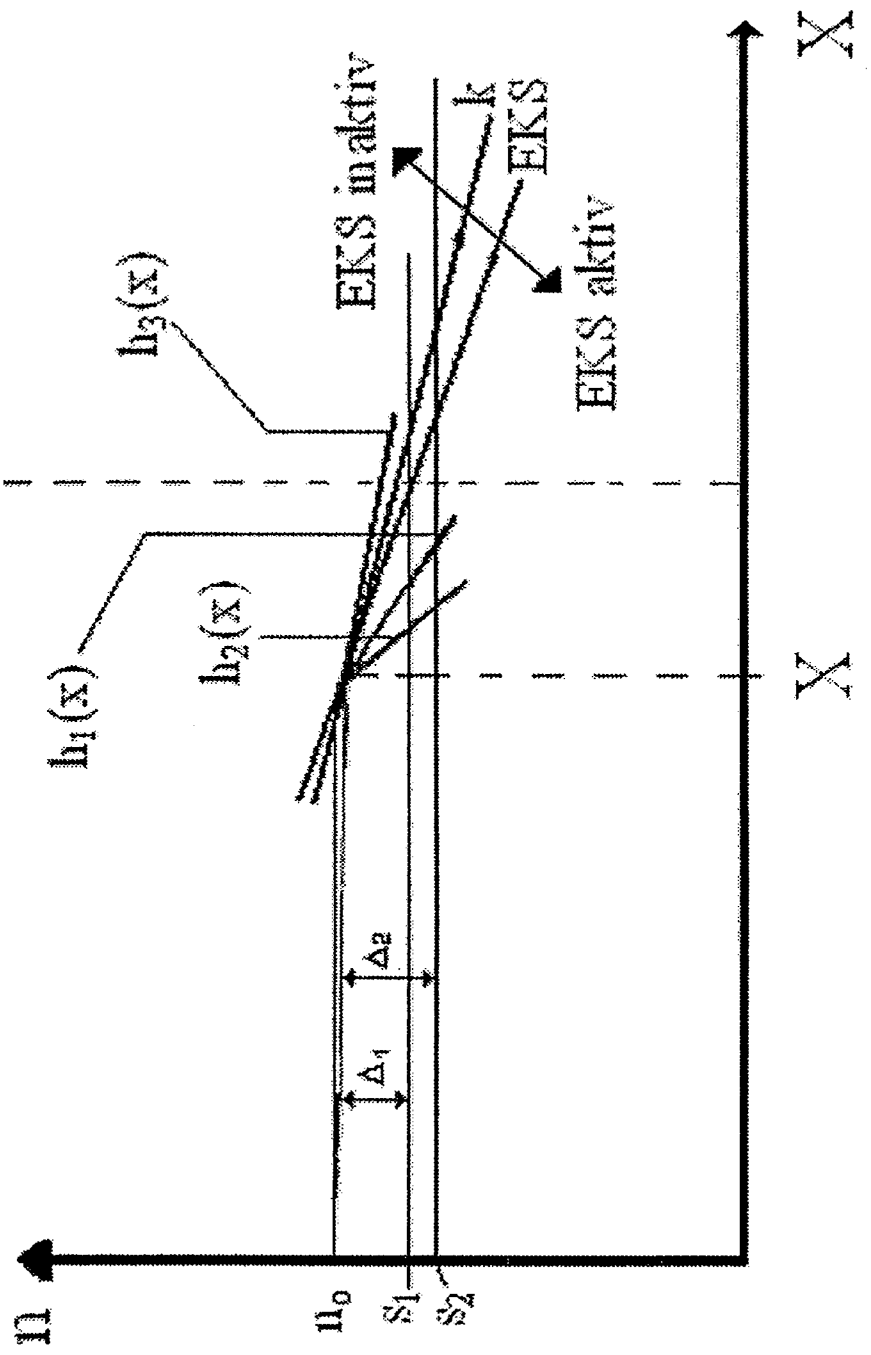
FIG. 2 depicts a schematic display of the course of a signal correlating to a rotary frequency of a window lifter motor and its change than to the actuating moment of the window lifter motor.

FIG. 2 is a schematic display of a regulation-depending course of the rotary frequency n of the electro motor of a further example of execution of the invention. The adjustment reaches, with constant rotary frequency, $n_0$ the location $x_0$. The rotary frequency n changes at this location $x_0$. Three different changes $n_1(x)$, $n_2(x)$ and $n_3(x)$ are schematically displayed in FIG. 2. In the case of an only slow change of the rotary frequency $n_3(x)$, the squeeze protection (EKS) is not activated and therefore stays inactive. In this case, it could for example be the matter of a regulation-dependent restriction of the window lifter, so that the window lifter would miss-detect and therefore miss-reverse the slow change of the rotary frequency $n_3(x)$ as event of squeezing-in.

The change of the rotary frequency $n_3(x)$ is below a minimum change value k for this rotary frequency course, so that there is not any adjustment of the current response level. The other two changes $n_1(x)$ and $n_2(x)$ on the other hand are in the active area of the squeezing-in protection and are additionally above the minimum changing value k. The squeeze-in protection activation threshold EKS and the minimum changing value k can thereby be different. In the example of FIG. 2, the minimum changing value k is smaller than the squeeze-in protection activation threshold EK, but this is dependent from the respective application and can also be carried out reversed with the same values. Different response levels $s_1$ or $s_2$ are set up depending from the height of the reduction of the rotary frequency n, which are differently distanced Δ1, Δ2, from the average value of the rotary frequency n before the squeezing event.

The change Δs of the current response level occurs in dependence from the ruling temporal or local change dF/dt or df/dx of the regulating power F(t) or F(x) at the time or location of detection. This dependence is displayed by way of example in FIG. 3. The change Δs of the current response level occurs in FIG. 3 in dependence from the temporal change dF/dt of the force F(t). In a first example, the change Δs of the current response level is formed by a square function from the temporal change dF/dt of the force F(t).

If, contrary to this first example of FIG. 3, a minimum changing value k of the force F(t) is used, temporal changes dF/dt of force F(t) below this minimum changing value k do not lead to a change of the current response level. Undesirable noise which can be caused by errors of measurements for example, does not lead to a change of the current response level with this concrete design. A particularly simple execution of the invention provides a change $\Delta s_3$ proportional to a temporal change dF/dt of the force F(t), of the current response level from the minimum changing value k.

Figure 3:
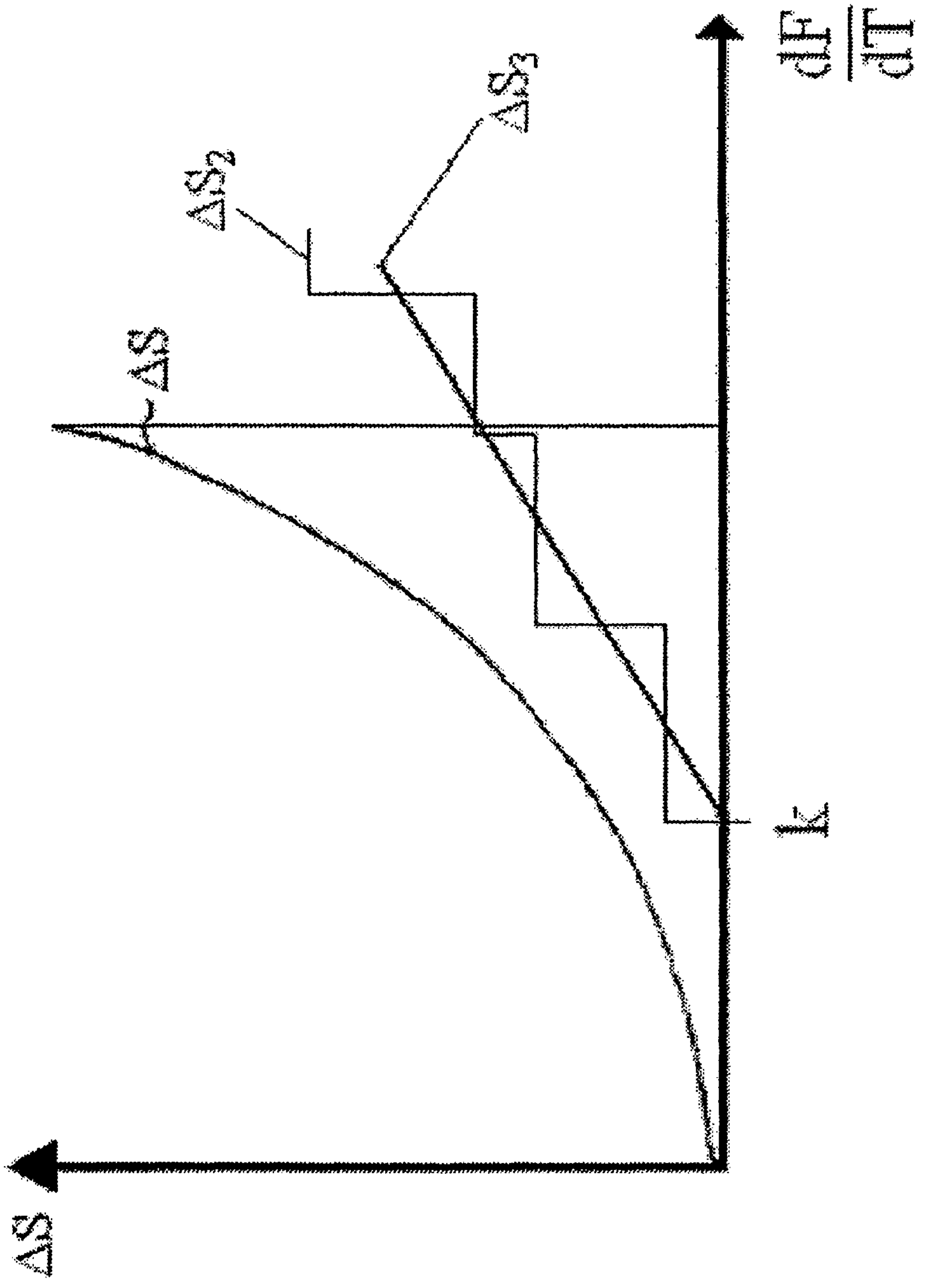
FIG. 3 depicts a schematic display of the changing values of the response level in dependence from the temporal change of the signal correlating to the actuating moment of the window lifter motor.

Alternative to the usage of a function with the input quantity of the temporal change dF/dt of force F(t) and the output quantity of the change $\Delta s_1$, $\Delta s_3$ of the response level, in a further example of FIG. 3, a dependence from the performance characteristics is schematically disclosed. Accordingly, changes $\Delta s_2$ of the current response level is assigned to changing areas of the temporal changes dF/dt of force F(f).

Figure 4:
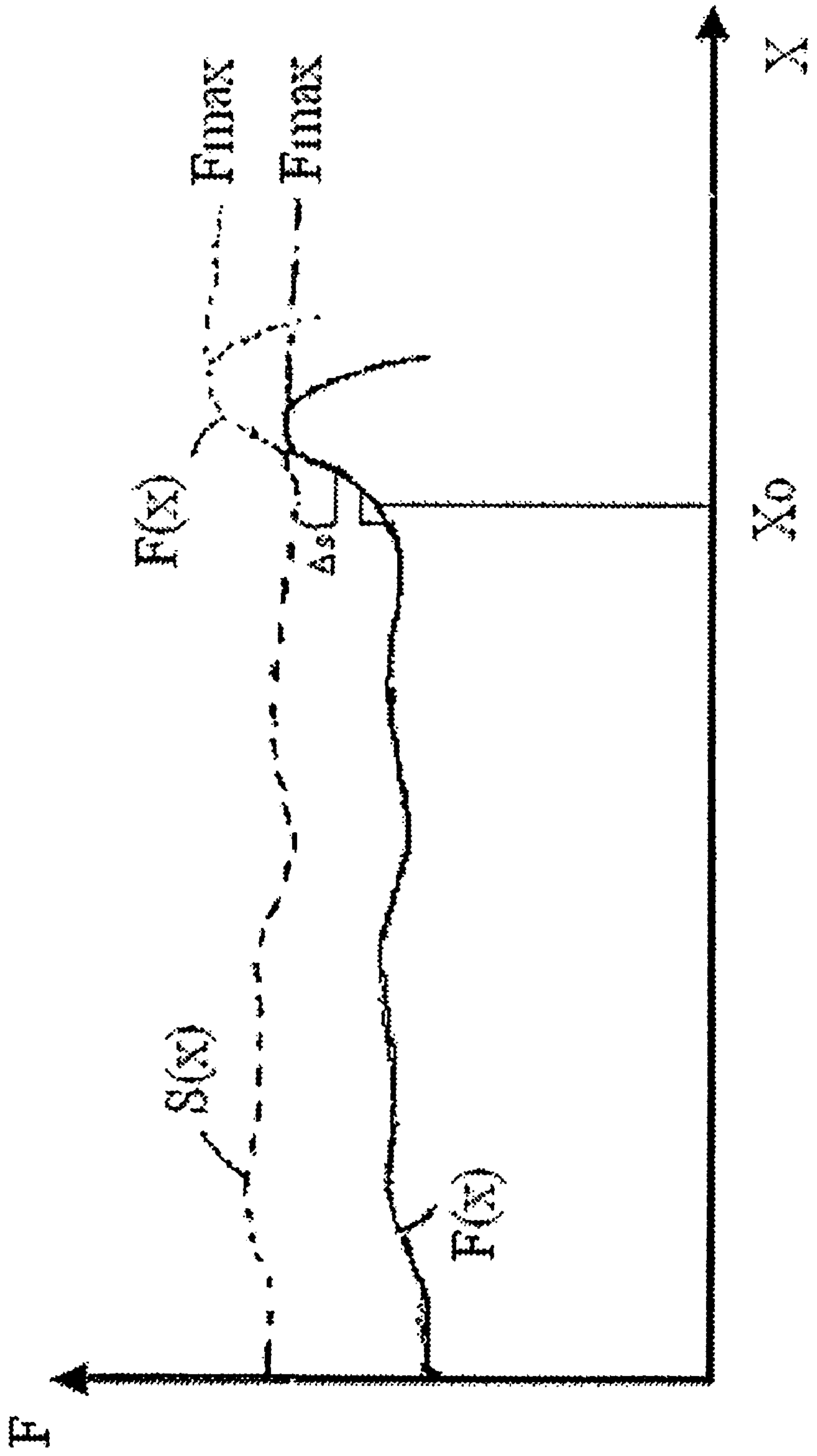
FIG. 4 depicts a schematic display of the local course of a signal correlating to the actuating moment of a window lifter actuator.

A local course of force F(x) is disclosed in FIG. 4. The respective adapted response level s(x) is led after the course of the force F(x) for the successive regulation, so that the distance changes only by a low amount for the already passed adjusting positions during the adjusting motion. A significant change dF/dx of force F(x) is determined at position x0. A change Δs of the current response level s(x) is determined according to the evaluations of the change of force dF/dx, as described above in, for example, FIG. 3. An advantage of this embodiment is that effective maximal squeeze-in power F' max to force Fmax is clearly reduced without reduction of the current response level s(x).

The following figures represent an application of the present application. As the present application applies to different moving parts of a moving vehicle, each of the parts potentially having different operating requirements, other figures may apply. Accordingly, the following figures or values are for illustrative purposes only. One threshold value for k may be 10N/mm with a derivation of dF/dx of m=1,5 (gradient of the function) where ΔS is the lowering level. The following relationship then applies: ΔS=(dF/dx [N/mm]−10 [N/mm]) * 1,5 [mm]; if dF/dx [N/mm]>10 [N/mm] else ΔS[N]=0. Other possibilities for mapping of $\Delta S_2$ include: 3 N for 10N/mm<dF/dx<16N/mm; 10 N for 16N/mm<dF/dx<22N/mm; 13 N for 22N/mm<dF/dx<28N/mm; and 20 N for 28N/mm<dF/dx. As a general matter, ranges for ΔS may be less than or limited to 20N and k should be equal or greater than 10N/mm.

FIG. 6 depicts application of the present invention into a device or system. Herein, an example of a power window application will be used with the understanding that the present invention may be applied to other moving vehicle parts. As depicted, window 70 includes a fixture 72 to which window lifter 73 is connected. The window lifter 73 includes cable 74 operating about a pulley 76 and gearbox 78. A magnet 80 is positioned proximate to the gearbox 78 so as to drive 82 the gearbox 78. Driving signals 83 are transmitted from electric motor 84 to magnet 80. The electric motor 84 receives driving signals 88 from driver unit 86 itself connected 92 to the computer unit 90 which receives sensor 94 detected information 96 so as to implement the above invention thereby controlling the electric motor 84 and window lifter 73.

The present invention has described above by way of various embodiments and the scope of the invention, and all such modifications as would be obvious to one skilled in the art are intended to be included within the scope of the following claims.

We claim:

1. A method of controlling a motor driven moveable part of a motor vehicle with a regulating device, the regulating device comprising an actuator, the method comprising the steps of:

a. determining a response level dependent upon the part;
b. detecting a signal correlating to a rotary moment of the actuator;
c. determining if the signal exceeds the response level;
d. stopping or initiating a stopping of an adjusting motion of the actuator, if the signal exceeds the response level;
e. determining a rate of changing of the signal;
f. determining a minimum changing value;
g. determining if the rate of change of the signal exceeds the minimum changing value;
h. lowering the response level if the rate of change of the signal exceeds the minimum changing value; and
i. maintaining the response level if the rate of change of the signal does not exceed the minimum changing value.

2. The method according to claim 1, further comprising the steps of:

a. determining strength of a previous signal; and
b. changing the response level in dependence of the strength.

3. The method according to claim 2, wherein the step of determining strength further comprises the step of averaging an evaluation of the the signal.

4. The method according to claim 1, wherein stiffness of the regulating device changes the response level.

5. The method according to claim 1, further comprising the step of mathematically correlating the response level to the rate of change.

6. The method according to claim 5, further comprising the steps of:

a. determining performance characteristics of the part;
b. determining changing values of the response level; and
c. assigning the changing values to the rate of change such that change of the response level occurs in dependence of the performance characteristics.

7. The method according to claim 5, further comprising the steps of:

a. receiving an input quantity corresponding to the signal; and
b. assigning the input quantity to the rate of change such that the change of the response level occurs in dependence of a mathematical function.

8. The method according to claim 7, wherein the mathematical function is a steady function.

9. The method according to claim 8, wherein the mathematical function comprises the lowering of the response level in proportion to the rate of change.

10. The method according to claim 7, wherein the mathematical function is a step function.

11. A computer readable medium, comprising:

a. a first code segment, adapted to cause a computer device to determine a response level dependent upon a part;
b. a second code segment adapted to cause a computer device to detect a signal correlating to a rotary moment of the an actuator;

c. a third code segment adapted to cause a computer device to determine if the signal exceeds the response level;

d. a fourth code segment adapted to cause a computer device to stop or initiating a stop of an adjusting motion of an actuator, if the signal exceeds the response level;

e. a fifth code segment adapted to determine the rate of change of the signal;

f. a sixth code segment to detennine if the rate of change of the signal exceeds a minimum changing value;

g. a seventh code segment to change the response level if the rate of change of the signal exceeds the minimum changing value; and h. an eighth code segment to maintain the response level if the rate of change of the signal does not exceed lime minimum changing value.

12. An article of manufacture comprising the computer readable medium of claim 11.

* * * * *